Aug. 10, 1965     D. S. GREEN     3,199,204
SQUARENESS GAUGE
Filed July 16, 1962     2 Sheets-Sheet 1
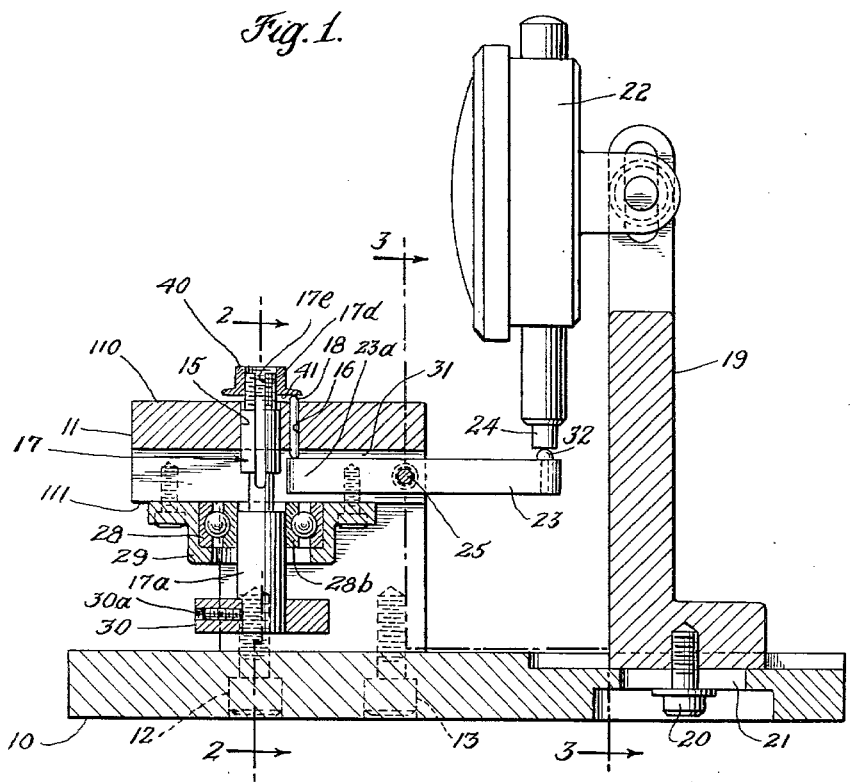
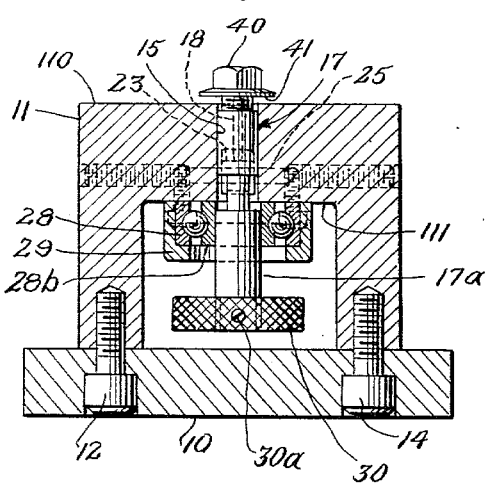
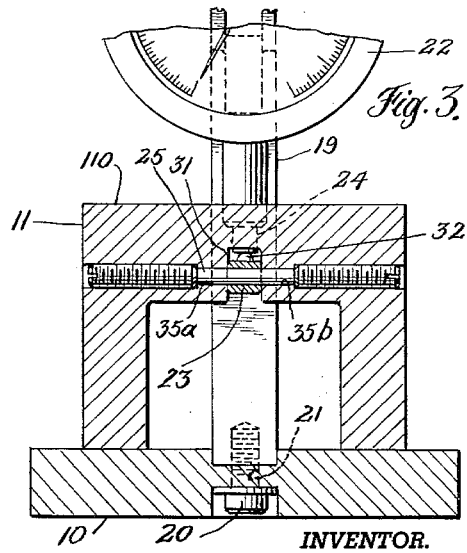
INVENTOR.
DAVID S. GREEN
BY
ATTORNEYS Aug. 10, 1965  D. S. GREEN  3,199,204
SQUARENESS GAUGE
Filed July 16, 1962  2 Sheets-Sheet 2

INVENTOR.
DAVID S. GREEN
BY
Synnestvedt & Lechner
ATTORNEYS

United States Patent Office 3,199,204
Patented Aug. 10, 1965

3,199,204
SQUARENESS GAUGE
David S. Green, Levittown, Pa., assignor to Standard Pressed Steel Co., Jenkintown, Pa., a corporation of Pennsylvania
Filed July 16, 1962, Ser. No. 210,008
8 Claims. (Cl. 33—174)

This invention relates to a gage which is useful in determining certain geometric relationships between the surface of internally and externally threaded members and the pitch diameter.

One embodiment of the gage is particularly useful in measuring the squareness of the bearing face of nuts and other internally threaded parts relative to the axis of the pitch diameter or axis of tap. Another embodiment of the gage is useful in measuring concentricity of internally threaded parts of circular section relative to the axis of the pitch diameter or the axis of tap. Still other embodiments of the gage are useful for determining the surface geometry of externally threaded parts with reference to the pitch diameter.

As shown in the drawings forming part of this specification—

FIGURE 1 is a sectional elevation of a gage made in accordance with this invention and illustrating the use of such gage for measuring the squareness of a nut face.

FIGURE 2 is a sectional view on line 2—2 of FIGURE 1.

FIGURE 3 is a sectional view on line 3—3 of FIGURE 1.

Figure 4:
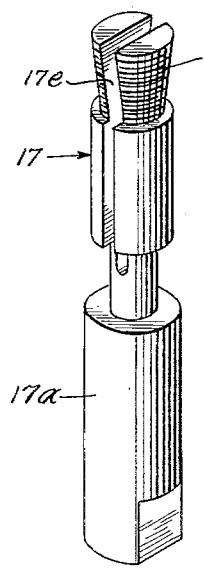
FIGURE 4 is an enlarged view of the threaded plug employed in the embodiment illustrated in FIGURE 1.

Referring now to FIGURES 1, 2 and 3, which illustrate a preferred embodiment of a nut thread squareness gage, it will be seen that the gage includes a base plate 10, a table like support 11 is secured to the base plate by suitable fastening means such as machine screws 12, 13 and 14. The table portion 110 of the support is provided with two circular openings 15 and 16. The threaded plug 17 passes through the opening 15. The opening 16 is of a size to provide a slide fit for a gaging pin 18. The threaded plug and the gaging pin will be described more fully hereinafter. A post or pedestal 19 to provide a support for a dial indicator device is mounted on the base plate 10. A suitable fastener such as a machine screw 20 is employed to secure the post to the base. A portion of the shank of screw 20 rides in a slot 21 in the base plate and permits the post to be moved within certain limits relative to the base. A suitable dial indicator 22 such as Federal Model C5M with a flat indicator point 24 is carried by the post. Preferably, the indicator should be secured to the post in such a way that the height of the indicator can be adjusted.

A lever 23 extends between the gaging pin 18 and the dial indicator. The indicating point 24 of the dial indicator rides on the spherically surfaced portion of a lever pin 32 seated near the end of the lever arm. The lever 23 is pivoted with a slide fit on a dowel pin 25. The pivot point is preferably arranged to give a 1:1 ratio in translating movements of the gaging pin to the indicator; however, any known constant lever ratio can be employed. As can be seen in FIGURE 3, the lever 23 is mounted on the underside of the support table 110. The dowel pin 25 is seated with a drive fit in openings 35a and 35b in the support aligned to position the lever arm in channel 31 on a pivot axis which is perpendicular to but offset from the axis of the support opening 16, the extent of offset being such that one end of the gaging pin 18 will ride on the inner end 23a of the lever arm.

A ball bearing assembly 28 is securely mounted on the underside 111 of the support table 110 by means of a bracket or clamp 29 which concentrically aligns the inner ball bearing race 28b with the axis of the circular opening 15. When the clamp is secured the outer ball bearing race will be stationary and the inner race is free to revolve. The threaded plug 17 is dimensioned so that the lower barrel portion 17a can be seated with a push fit in the inner race opening 28b of the ball bearing assembly and a knurled knob 30 can be attached by set screw 30a to the end of the plug barrel which passed through the roller bearing. This knob permits the plug 17 to be rotated about the axis of its pitch diameter and also will cause any nut threaded on the plug to be rotated about its axis of tap or of its pitch diameter. When the plug 17 is seated in the ball bearing assembly, the threaded portions 17b should project through the opening 15 sufficiently to permit the pulg to receive the nut to be checked.

Figure 7:
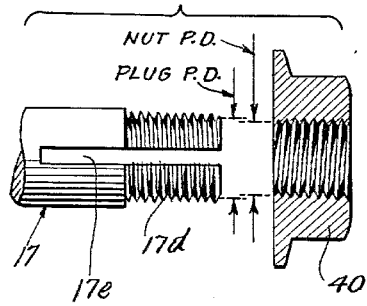
FIGURES 7, 8 and 8a illustrate different embodiments of the threaded plug.

As can be seen in the plug embodiment illustrated in FIGURE 7, the pitch diameter (P.D.) of the threads 17d of the plug 17 is slightly greater than the pitch diameter (P.D.) of the threads of nut 40 to be checked. Further, the threaded end portion of the plug is diametrically slotted 17e. Because of the slotting and these dimensional differences, i.e., the pitch diameters of the external threads and of the internal threads, the plug will yieldably resist squeezing action and reduction of the pitch diameter of the plug threads when the nut is threaded thereon. This arrangement will insure that a good contact is established between the mating threads.

Figure 8:
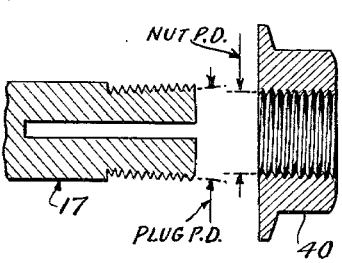
Figure 8A:
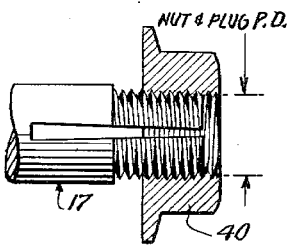

As can be seen in the plug embodiment illustrated in FIGURES 8 and 8a, the proper contact between the mating threads can also be obtained by providing the plug threads with a slight back taper i.e., one whereby when the nut 40 to be checked is threaded on the plug, the mean pitch diameter (M.P.D.) of the nut thread and the pitch diameter (P.D.) of the squeezed plug threads will when viewed in section, lie on a straight line.

Where the nut to be checked is "squeezed" or distorted to provide locking threads, the plug 17 can be unslotted and have threads with a minimum pitch diameter. In such cases, the nut is threaded on the plug without going through the squeezed portions.

Figure 5:
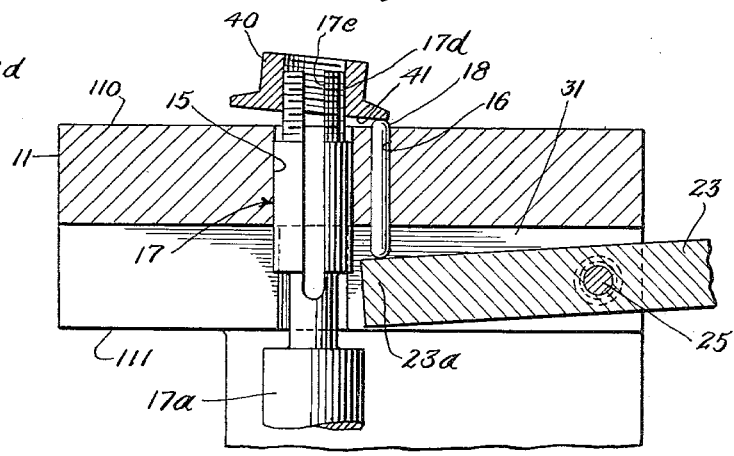
FIGURE 5 is an enlarged sectional view of a portion of the gage illustrated in FIGURE 1 showing a nut out of square.

The centerlines of the openings 15 and 16 are parallel, and the distance between the centerlines of the openings 15 and 16 are such that the gaging pin 18 will make contact on the bearing surface 41 of a nut 40 threaded on plug 17 at the point where the measurement is to be taken. As can be seen in FIG. 5, the ends of the gaging pin 28 are provided with radii; this enables proper contact with the nut bearing surface and with the lever arm. The gaging pin is of such a length that one end extends above the top surface 110 of the table support a sufficient distance so that when the nut to be checked is threaded on the plug, the bearing surface 41 will make contact with the gaging pin. Further, in this connection, the nut should not be threaded on the plug to a point where the bearing surface 41 will contact the face of the table support 110.

In use, the nut is screwed on the threaded plug to a point where the bearing surface of the nut contacts the gaging pin and thereby activates the dial indicator. The thread plug and nut are then rotated about the axis of the pitch diameter by turning the knurled knob 30. As the nut rotates differences in squareness will cause the gaging pin to move up and down in a path generally parallel to the axis of tap (or the axis of the pitch diameter) causing the lever arm to move and activate the dial indicator. In this way, movements of the bearing face of the rotating nut are measured relative to a fixed plan perpendicular to the axis of the pitch diameter or axis of tap.

Figure 6:
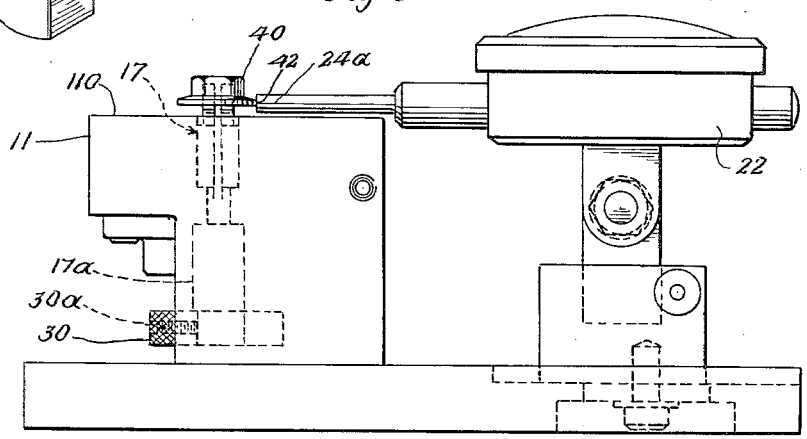
FIGURE 6 is a side view in partial section of another embodiment of a gage made according to the present invention for measuring concentricity of the nut.

In FIGURE 6, the gage is illustrated in use as a concentricity gage. The general arrangement of this embodiment is very similar to that of the squareness gage, however, the indicator point 24a bears against a vertical circular side wall 42 of the nut 40. When the nut 40 is turned by means of the knurled knob about the axis of tap, the indicator point 24a will follow any movements of the surface 42 caused by out of roundness or concentricity and the movements of the dial indicator will measure movements of the circular side wall of the rotating nut relative to a fixed line parallel to the axis of tap.

By employing a threaded plug member having internal threads, rather than the externally threaded plug of FIG. 4, the gage can be used to receive externally threaded pieces and measure the surface geometry of such parts.

I claim:
1. A gage comprising, in combination
   (1) a support,
   (2) a rotatable element carried by said support,
   (3) said element including an externally threaded plug member adapted to receive a nut, and concentrically rotate the nut about its axis of tap,
   (4) the pitch diameter of the plug threads being slightly greater than the maximum pitch diameter of the nut threads,
   (5) the threaded end of the plug being generally diametrically slotted so as to yieldably resist reduction of the pitch diameter when the nut is threaded thereon and thereby insure that good contact is established between mating threads,
   (6) a dial indicator carried by said support,
   (7) a gaging pin adapted to bear against the nut and to follow movements of points on the surface of the nut relative to the axis tap,
   (8) and means for constantly transmitting movements of the gaging pin to the dial indicator.

2. A gage according to claim 1 wherein the gaging pin follows movements of the load bearing face of the rotating nut relative to a fixed plane perpendicular to the axis of tap.

3. A gage according to claim 1 wherein the gaging pin follows movements of a circular side wall portion of the rotating nut relative to a fixed line parallel to the axis of tap.

4. A gage according to claim 1 wherein the support includes a table portion, a roller bearing assembly having an inner race, an outer race and roller bearings, the outer race being secured to the underside of the table, and the inner race being concentrically aligned with an opening in the table, the threaded plug member being journaled in the table opening with the threaded portion projecting above the top surface of the table and having a lower barrel portion securely seated in the inner race opening; the gaging pin extending through a second opening in the table top, the axis of said opening being parallel to the axis of the plug opening and offset therefrom a distance which permits the gaging pin to contact the bearing face of a nut threaded on the plug and means including a lever for transmitting axial movements of the gaging pin that are parallel to the axis of the pitch diameter of the nut to the dial indicator when the nut is rotated.

5. A gage for measuring the squareness of nuts comprising an externally threaded plug, said plug being adapted to receive a threaded nut having mating threads, said plug threads having a slight back taper, said plug being slotted at the threaded end so as to yieldably resist reduction of the pitch diameter of the plug threads by squeezing action when a nut is threaded thereon, said back taper being such that the mean pitch diameter of the nut thread and the pitch diameter of the squeezed plug thread will, when viewed in a section along the longitudinal axis of the plug, be in a straight line, said plug being adapted to concentrically rotate said nut about the axis of its pitch diameter, and a gaging pin being against the bearing face of the nut, said pin being free to move in directions along the line of an axis parallel to the axis of the pitch diameter of the threaded nut and means measuring the axial movements of the gaging pin as the threaded nut is rotated.

6. A gage for measuring the concentricity of nuts having a cylindrical side wall surface, said gage comprising an externally threaded plug adapted to receive a threaded part having mating threads, said plug threads having a slight back taper, said plug being slotted at the threaded end so as to yieldably resist reduction of the pitch diameter of the plug threads by squeezing action when a nut is threaded thereon and wherein the back taper is such that the mean pitch diameter of the squeezed plug threads will, when viewed in section taken on the longitudinal axis of the plug, lie on a straight line, said plug being adapted to concentrically rotate said part about the axis of its pitch diameter, and a gaging pin bearing against the nut cylindrical side wall surface, said pin being free to move axially in directions perpendicular to the axis of the pitch diameter of the threaded nut and means measuring the axial movements of the gaging pin as the threaded nut is rotated.

7. A gage for measuring the squareness of nuts comprising an externally threaded plug, the threads of the plug having a pitch diameter slightly greater than the pitch diameter of the nut threads, the threaded end of the plug being slotted and further being resilient so as to yieldably resist reduction of the pitch diameter of the plug threads when a nut is threaded thereon and thereby insure that good contact is established between the mating threads, a gaging pin bearing against the bearing face of the nut, said pin being free to move axially only in directions parallel to the axis of the pitch diameter of the nut, and means measuring the axial movements of the gaging pin as the threaded nut is rotated.

8. A gage for measuring the concentricity of a nut having a cylindrical side wall surface, said gage comprising an externally threaded plug, the threads of the plug having a pitch diameter slightly greater than the pitch diameter of the nut threads, the threaded end of the plug being slotted so as to yieldably resist reduction of the pitch diameter of the plug threads when a nut is threaded thereon, and thereby insure that good contact is established between mating threads, a gaging pin bearing against said side wall surface, said gaging pin being free to move axially only in directions perpendicular to the axis of the pitch diameter of the nut and means measuring the axial movements of the gaging pin as the threaded nut is rotated.

References Cited by the Examiner

UNITED STATES PATENTS

| | | | |
|---|---|---|---|
| 1,543,795 | 6/25 | Rockwell | 33—148 |
| 1,878,493 | 9/32 | Graham. | |
| 2,366,394 | 1/45 | Gerber | 33—199 |
| 2,370,503 | 2/45 | Straw | 33—174 |
| 2,371,451 | 3/45 | Larson | 33—174 |
| 2,408,689 | 10/46 | Seme. | |
| 2,549,393 | 4/51 | Siesel | 151—14 |
| 2,602,235 | 7/52 | Dow | 33—174 |
| 2,648,135 | 8/53 | Gates | 33—174 |
| 2,806,294 | 9/57 | Cargill | 33—199 |
| 2,991,695 | 7/61 | Jones | 151—14 X |

FOREIGN PATENTS 548,650  10/42  Great Britain.

ISAAC LISANN, *Primary Examiner.*